United States Patent
Turban et al.

(12) 
(10) Patent No.: US 6,678,475 B1
(45) Date of Patent: Jan. 13, 2004

(54) METHOD OF TRANSMITTING A CONCATENATED SIGNAL

(75) Inventors: Karl-Albert Turban, Leonberg-Höfingen (DE); Bernd X. Weis, Korntal (DE)

(73) Assignee: Alcatel, Paris (FR)

( * ) Notice: Subject to any disclaimer, the term of this patent is extended or adjusted under 35 U.S.C. 154(b) by 580 days.

(21) Appl. No.: 09/612,250

(22) Filed: Jul. 7, 2000

(30) Foreign Application Priority Data

Jul. 13, 1999 (DE) .......................................... 199 32 579

(51) Int. Cl.$^7$ ................................................. H04J 14/02
(52) U.S. Cl. ............................. 398/79; 398/71; 398/58; 398/135
(58) Field of Search .................................. 359/124, 125, 359/127, 118, 152, 174; 398/79, 71, 82, 58, 135, 173

(56) References Cited

U.S. PATENT DOCUMENTS

| | | | | |
|---|---|---|---|---|
| 5,717,795 A | * | 2/1998 | Sharma et al. | 385/24 |
| 5,999,288 A | * | 12/1999 | Ellinas et al. | 359/119 |
| 6,169,616 B1 | * | 1/2001 | Cao | 359/130 |

* cited by examiner

Primary Examiner—Kinfe-Michael Negash
(74) Attorney, Agent, or Firm—Sughrue Mion, PLLC

(57) ABSTRACT

A method of transmitting a concatenated signal consisting of at least two component signals over an optical network comprising at least three network elements (1, 2, 3, 7, 8, 9, 10) is disclosed in which at least two component signals are transmitted on at least two different wavelengths, and in which the component signals are assigned to the wavelengths for each section between two network elements (1, 2, 3, 7, 8, 9, 10) in such a way as to minimize differential delays between the component signals for a predetermined receiving location. Concatenated transmission capacity can be allocated even if it is no longer available on one wavelength as a coherent whole.

13 Claims, 1 Drawing Sheet

METHOD OF TRANSMITTING A CONCATENATED SIGNAL

BACKGROUND OF THE INVENTION

This invention relates to a method of transmitting a concatenated signal consisting of at least two component signals over an optical network comprising at least three network elements.

In digital networks, signals are generally transmitted from a transmitting unit to one or more receiving units in the form of data packets. Signals having a greater data volume than that of one packet are distributed among different packets, which are transmitted in a temporal sequence and are reassembled in the receiving unit. Continuous signals, such as analog telephone signals or television signals, are divided into component signals, digitized, and transmitted in the form of consecutive packets. If time-division multiplexing is used, signals from different sources can be transmitted over the network together, also simultaneously to different receiving units.

In SDH networks (SDH=Synchronous Digital Hierarchy), so-called VC-4 containers, among others, are used for the component signals. Two or more concatenated VC-4 containers then contain the overall signal.

For the transmission of SDH signals, WDM networks (WDM=wavelength-division multiplex) are increasingly being used. A WDM network is an optical network that makes at least two wavelengths available for the transmission of signals. One method of transmitting a broadband signal in at least two logically concatenated VC-4 containers involves transmitting the individual VC-4 containers, i.e., the individual component signals, in a temporal sequence and in interleaved form using only one wavelength, as is already known from the SDH standards for electric SDH signals. A further signal consisting of two or more VC-4 containers can be transmitted simultaneously on another wavelength.

If the individual component signals of a signal are transmitted in a temporal sequence, i.e., contiguously in time, this is referred to in agreed standards as "contiguous concatenation".

Another method of transmitting a signal consisting of at least two VC-4 containers involves introducing a logical concatenation i.e., transmitting the individual containers simultaneously with individual overheads and possibly using two or more different wavelengths. This is referred to as "virtual concatenation". By virtual concatenation, the bit rate can be adapted to customer requirements in smaller steps. The containers can be distributed arbitrarily via an optical multiplexer, for example. Optimum use can be made of the available transmission capacity. The assignment of the component signals to the wavelengths is made in the transmitting facility at the transmitting location and is maintained over the entire transmission link up to the specified receiving location. A disadvantage of virtual concatenation is, however, that the different propagation velocities for different wavelengths may result in undesirably and sometimes inadmissibly great differential delays for the individual component signals. On long-distance links, e.g., on international links, the differential delays between the component signals may be so great, e.g., 70 $\mu$s, that the order of the received component signals no longer corresponds with the order of the transmitted component signals.

One way of avoiding this problem is not to use virtual concatenation or to restrict it to short distances. Another approach uses buffers in relay stations. Each buffer causes additional differential delays and requires an additional control facility for detecting the component signals and restoring the correct sequence.

SUMMARY OF THE INVENTION

It is therefore an object of the invention to provide a method of or apparatus for transmitting a concatenated signal which does not have the above disadvantages.

This object is attained by a method of transmitting a concatenated signal comprising at least two component signals over an optical network of at least three network elements, characterized in that the at least two component signals are transmitted on at least two different wavelengths, and the component signals are assigned to the wavelengths for each section between two network elements in such a way as to minimize differential delays between the component signals for a predetermined receiving location.

The object is further attained by a network element of an optical network for transmitting concatenated signals, characterized in that the network element comprises a receiving unit for receiving at least two component signals of a concatenated signal on at least two wavelengths, a measuring unit is provided for measuring differential delays between the component signals of the received, concatenated signal, and a transmitting unit is provided for transmitting the received, concatenated signal, the transmitting unit being adapted to change the assignment of the component signals to the wavelengths before transmission if at least one measured differential delay exceeds a predetermined threshold.

The object of the invention is further attained by a network comprising at least three network elements and a network management connected to all network elements, characterized in that each of the network elements is adapted to assign different wavelengths to different component signals of a concatenated signal to be transmitted, and the network management specifies the individual assignments for each of the network elements in such a way that differential delays of the component signals of the concatenated signal are minimized for a predetermined receiving location.

The transmission of the concatenated signal takes place with an assignment of the component signals to the wavelengths that changes during transmission. In this way, an average propagation velocity is formed for the individual component signals. This means that each component signal, viewed over the entire transmission link, is delayed by approximately the same amount, so that the differential delays between individual component signals are minimized or even compensated for.

To accomplish this, the transmission link is divided into sections, for example. If the differential delay between the component signals varies so widely as to exceed a predetermined value, the assignment of the component signals to the wavelengths will be changed on particular sections by assigning the component signal having the least delay to that wavelength which has the lowest velocity of propagation. Thus, component signals transmitted fast on the first sections are transmitted at reduced speed on the subsequent sections. Component signals transmitted slowly on the first sections are transmitted on the subsequent sections on a wavelength that has a higher velocity of propagation. Viewed over the entire transmission link, changes in the assignments of the component signals to the wavelengths can be made several times. For example, a component signal is transmitted on the first three sections on a wavelength with a high propagation velocity, on the fourth and fifth sections on a wavelength with a low propagation velocity, on the sixth section on a wavelength with a very high propagation velocity, and on the seventh, eighth, and ninth sections on a wavelength with a low propagation velocity.

In this way, differential delays are minimized or, ideally, compensated for, particularly for long transmission links.

In addition, delays and differential delays can be registered and analyzed in a central network management. The network management can also perform the assignment control function.

Through the distribution of individual signals to two or more wavelengths, blocking can be avoided.

The individual VC-4s of the virtual concatenation can be distributed over two or more wavelengths. If there is not enough capacity available on one wavelength, the individual VC-4s can be distributed to two or more wavelengths in an appropriate and cost-effective manner. If two or more wavelengths are used, the individual wavelengths can be utilized up to 100% before any further wavelengths are used, so that no unused capacities remain.

Concatenated transmission capacity can be allocated even if it is no longer available on one wavelength as a coherent whole.

Advantageous developments of the invention are set forth in the dependent claims.

BRIEF DESCRIPTION OF THE DRAWINGS

Two embodiments of the invention will now be explained with reference to the accompanying drawing, in which.

DETAILED DESCRIPTION OF THE INVENTION

Figure 1:
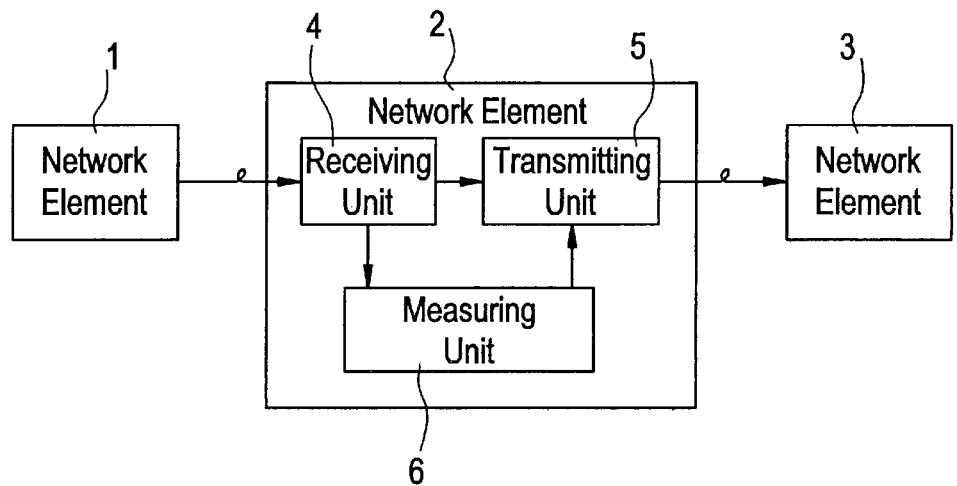
FIG. 1 is a schematic block diagram of a first network in accordance with the invention.

The first embodiment will now be explained with the aid of FIG. 1. FIG. 1 shows a first network in accordance with the invention.

The network contains three network elements 1, 2, 3, which are interconnected by optical lines.

Network element 1 is designed as a center. The center serves to transmit signals and is implemented as an optical multiplexer, for example. Signals from different sources are multiplexed and transmitted over a fiber optic line to network element 2. A signal consisting of at least two virtually concatenated component signals is distributed among two or more wavelengths. Four wavelengths are provided, for example. A signal consists of four concatenated component signals, for example. The component signals are in the form of VC-4 containers, for example. The frame structure corresponds to the SDH structure. The first component signal is assigned to the first wavelength. The second component signal is assigned to the second wavelength. The third component signal is assigned to the third wavelength. The fourth component signal is assigned to the fourth wavelength. The first wavelength has, for example, the highest velocity of propagation, and the fourth wavelength the lowest.

Network element 2 is designed as a crossconnect or an add-drop multiplexer. Network element 2 serves as a relay station between network element 1 and network element 3.

Network element 2 contains a receiving unit 4 for receiving at least two component signals of a concatenated signal on at least two wavelengths, a measuring unit 6 for measuring the differential delays between the component signals of the received, concatenated signal, and a transmitting unit 5 for transmitting the received, concatenated signal. The transmitting unit is suited to making a change in the assignment of the wavelengths to the component signals before transmission if at least one measured differential delay exceeds a predetermined threshold.

Receiving unit 4 contains, for example, an optical demultiplexer. The first component signal transmitted by network element 1 is received on the first wavelength, the second component signal is received on the second wavelength, etc. The received component signals are converted from optical to electrical form. The signals intended for retransmission are fed to transmitting unit 5. The remaining signals are extracted from the received data stream and processed. Measuring unit 6 receives information about the time of arrival of individual component signals, e.g., time x=arrival of the first component signal of the first signal, time x+1= arrival of the second component signal of the first signal, etc.

Measuring unit 6 contains a threshold detector, for example. It measures all differential delays between the component signals of a signal. Component signals that are transmitted on different wavelengths are transmitted over the sections between network element 1 and network element 2 with different speeds due to chromatic dispersion. This results in differential delays between the individual component signals. If the differential delays become too great, a correction will be made. If the measured differential delays exceed a predetermined threshold, the assignment of the component signals to the wavelengths will be changed. Measuring unit 6 will send to transmitting unit 5 a control signal with the information that the assignment must be changed for a given signal, indicating, if necessary, which component signal is to be assigned to which wavelength.

In transmitting unit 5, which contains an optical multiplexer, for example, the assignment of the component signals to the wavelengths is changed before transmission, namely during electrical-to-optical conversion. For example, in response to a detected threshold transgression, the first component signal is assigned the fourth wavelength for the section between network element 2 and network element 3, the second component signal of the same signal is assigned the third wavelength, the third component signal is assigned the second wavelength, and the fourth component signal is assigned the first wavelength.

The change in the assignment is thus made in such a way that a wavelength with a low propagation velocity is assigned to a component signal which is received on a wavelength with a high propagation velocity, and that a wavelength with a high propagation velocity is assigned to a component signal which is received on a wavelength with a low propagation velocity.

In place of measuring unit 6, a scrambler may be provided for changing the assignment of the wavelengths for each component signal prior to transmission of the latter without previous measurement.

The scrambling may, for instance, be based on known static propagation parameters that were determined, for example, during the calibration of the transmission link or by means of test signals during operation, and stored. With this alternative, no measurement of the differential delays of individual component signals of a concatenated signal is required. All component signals that are received on the first wavelength and are intended for retransmission are retransmitted automatically on the fourth wavelength, for example. Alternatively, random scrambling of the wavelengths to the component signals can be applied. With this alternative, which can be used to advantage particularly with very long transmission links, the individual speeds of propagation average out. The transmitting unit includes, for example, a random-number generator that determines the wavelength on which a component signal is transmitted.

Figure 2:
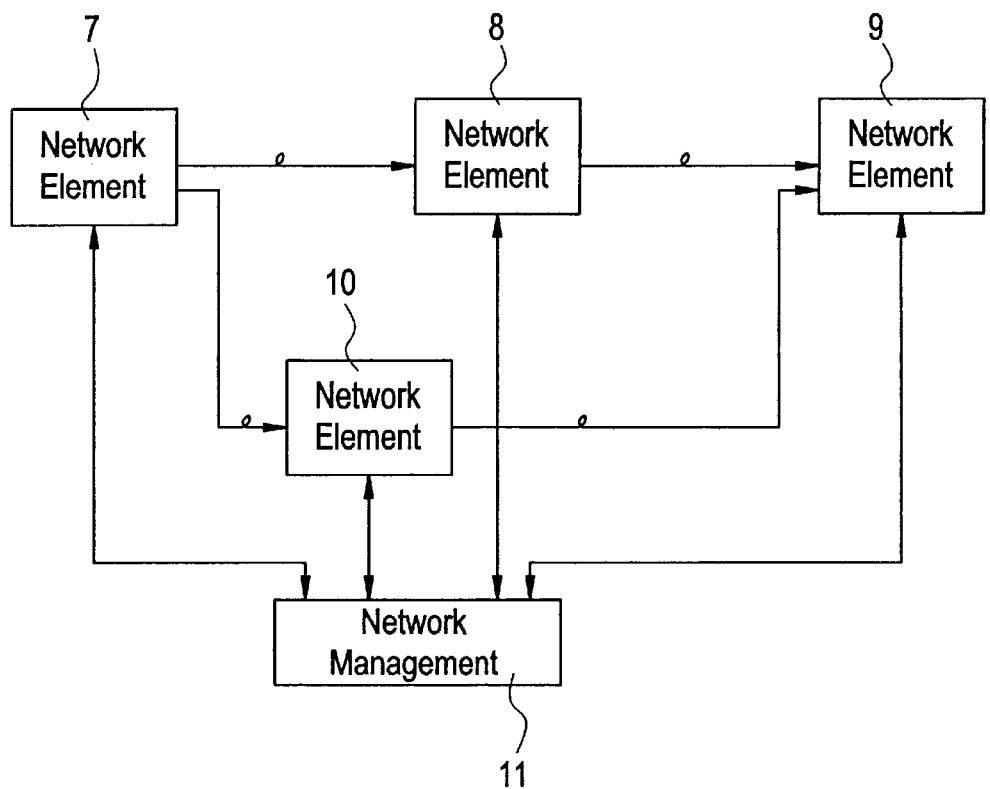
FIG. 2, is a schematic block diagram of a second network in accordance with the invention.

The second embodiment will now be explained with the aid of FIG. 2. FIG. 2 shows a second network in accordance with the invention.

The network contains four network elements 7, 8, 9, 10, which are interconnected by optical lines, and a central network management 11, which is connected to all network elements 7, 8, 9, 10 by electric lines.

Each network element 7, 8, 9, 10 is suited to assigning different wavelengths to different component signals of a concatenated signal to be transmitted. Network management 11 specifies the individual assignments to each network element 7, 8, 9, 10 in such a way that the differential delays of the component signals of the concatenated signal are minimized for a given receiving location.

In one variant, static propagation parameters which were determined during calibration and/or start-up, for example, are stored in network management 11.

Network management 11 contains a processing device for computing the assignments from the stored values.

A concatenated signal consisting of four component signals can be transmitted from network element 7 to network element 9 over two different paths. For example, the first and fourth component signals can be transmitted over the sections from network element 7 to network element 8 to network element 9, and the second and third component signals can be transmitted over the sections from network element 7 to network element 10 to network element 9. In addition, the four component signals can be transmitted partly on the same wavelength and partly on different wavelengths; for example, the first component signal can be transmitted on the first of four wavelengths, the second component signal can also be transmitted on the first of four wavelengths, the third component signal can be transmitted on the fourth wavelength, and the fourth component signal on the third wavelength. At network elements 8 and 10, the assignment of the component signals to the wavelengths can be changed under control of network element 11. Because of the different paths with usually different physical lengths and because of the different wavelengths, different differential delays may occur for the individual component signals of a concatenated signal to a higher degree. Then, in a further variant, the central network management 11, being aware of the individual delays in the individual network elements 8, 9, 10, can compute and specify the optimum wavelength changes for the individual component signals.

To summarize, the invention proposes a method of transmitting a concatenated signal consisting of at least two component signals over an optical network comprising at least three network elements 1, 2, 3, 7, 8, 9, 10 which involves transmitting at least two component signals on at least two different wavelengths and assigning the component signals to the wavelengths for each section between two network elements 1, 2, 3, 7, 8, 9, 10 in such a way as to minimize the differential delays between the component signals for a predetermined receiving location.

In both embodiments, the number of network elements has been chosen by way of example. It is also possible to interconnect one thousand network elements, for example. The topology of the networks is also exemplary. The networks may for instance be point-to-point networks, point-to-multipoint networks, mesh networks, or the like. While the networks are shown as unidirectional networks, it is to be understood that the invention can also be applied to bidirectional networks, with the assignments being changed in only one direction or in both directions.

The network management of the second embodiment may also be connected to the network elements by optical instead of electric lines.

The two embodiments can also be combined.

The invention discloses a method of optically transmitting a concatenated signal. The concatenated signal originates from a digital network, e.g., an SDH network. The digital network may also be a SONET network, for example. Thus, the invention also discloses in particular a method of optically transmitting a concatenated SONET signal containing at least one SONET container.

What is claimed is:

1. A method of transmitting a concatenated signal including at least two component signals over an optical network having at least three network elements, said method comprising:

transmitting at least two component signals on at least two different wavelengths, and assigning the component signals to the wavelengths for each section between two network elements in such a way as to minimize differential delays between the component signals for a predetermined receiving location.

2. A method as claimed in claim 1, wherein at least one of the network elements is designed as one of a center, receiver, crossconnect, add-drop multiplexer, or optical multiplexer.

3. A method as claimed in claim 1, wherein at least one component signal is a VC-4 container of a virtually concatenated SDH signal.

4. A network element of an optical network for transmitting concatenated signals, the network element comprising:

a receiving unit configured to receive at least two component signals of a concatenated signal on at least two wavelengths, a measuring unit configured to measure differential delays between the received component signals of the concatenated signal, and a transmitting unit configured to transmit the received, concatenated signal, said transmitting unit further configured to change the assignment of the component signals to the wavelengths before transmission if at least one measured differential delay exceeds a predetermined threshold.

5. A network element as claimed in claim 4, wherein the change in the assignment is made in such a way that a component signal which is received on a wavelength with a high propagation velocity is assigned a wavelength with a low propagation velocity, while a component signal which is received on a wavelength with a low propagation velocity is assigned a wavelength with a high propagation velocity, and that scrambling based on known static propagation parameters or random scrambling of the component signals to the wavelengths is applied.

6. A network element as claimed in claim 4, wherein at least one of the network elements is designed as one of a center, receiver, crossconnect, add-drop multiplexer, or optical multiplexer.

7. A network element as claimed in claim 4, wherein at least one component signal is a VC-4 container of a virtually concatenated SDH signal.

8. A network element of an optical network for transmitting concatenated signals, the network element comprising:
- a receiving unit configured to receive at least two component signals of a concatenated signal assigned to at least two wavelengths,
- a scrambler configured to change the assignment of the wavelengths for each component signal before transmission of said component signal, and
- a transmitting unit for transmitting the received, concatenated signal.

9. A network element as claimed in claim 8, wherein the change in the assignment is made in such a way that a component signal which is received on a wavelength with a high propagation velocity is assigned a wavelength with a low propagation velocity, while a component signal which is received on a wavelength with a low propagation velocity is assigned a wavelength with a high propagation velocity, and that scrambling based on known static propagation parameters or random scrambling of the component signals to the wavelengths is applied.

10. A network comprising:
- at least three network elements, said network elements configured to assign different wavelengths to different components signals of a concatenated signal to be transmitted; and
- a network management unit connected to said network elements, the network management unit configured to specify the individual assignments for each of the network elements in such a way that differential delays of the component signals of the concatenated signal are minimized for a predetermined receiving location.

11. A network as claimed in claim 10, wherein the network management unit includes static propagation parameter storage, and a processing device for computing the assignments from stored static propagation parameter values.

12. A network as: claimed in claim 10, wherein at least one of the network elements is designed as one of a center, receiver, crossconnect, add-drop multiplexer, or optical multiplexer.

13. A network as claimed in claim 10, wherein at least one component signal is a VC-4 container of a virtually concatenated SDH signal.

* * * * *